United States Patent
Hanawa (10) Patent No.: US 7,441,638 B2
(45) Date of Patent: Oct. 28, 2008

(54) FRONT FORK

(75) Inventor: Nobumichi Hanawa, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 215 days.

(21) Appl. No.: 11/290,492

(22) Filed: Dec. 1, 2005

(65) Prior Publication Data

US 2006/0124414 A1    Jun. 15, 2006

(30) Foreign Application Priority Data

| Dec. 9, 2004 | (JP) | ............................ 2004-356380 |
| Feb. 8, 2005 | (JP) | ............................ 2005-031184 |
| May 12, 2005 | (JP) | ............................ 2005-139410 |
| Jun. 29, 2005 | (JP) | ............................ 2005-189606 |

(51) Int. Cl.
*F16F 9/06* (2006.01)

(52) U.S. Cl. ............... 188/314; 188/318; 280/124.105; 280/124.158; 267/64.15

(58) Field of Classification Search ................ 188/314, 188/315, 318, 313; 267/64.15, 64.25, 64.16, 267/64.17; 280/124.104, 124.105, 124.16, 280/124.161, 124.157, 124.158, 124.159
See application file for complete search history.

(56) References Cited

U.S. PATENT DOCUMENTS

| 4,091,897 A | * | 5/1978 | Andrepont | ................. 188/314 |
| 4,506,751 A | * | 3/1985 | Stephens | ................. 267/64.15 |
| 4,695,226 A | * | 9/1987 | Marchitto et al. | ........... 188/314 |
| 4,743,000 A | * | 5/1988 | Karnopp | ..................... 188/314 |
| 5,480,011 A | * | 1/1996 | Nagai et al. | .............. 188/266.3 |
| 5,593,007 A | * | 1/1997 | Siltanen | ....................... 188/314 |
| 5,597,054 A | * | 1/1997 | Nagai et al. | .................. 188/318 |
| 5,941,508 A | * | 8/1999 | Murata et al. | ............. 267/64.17 |
| 6,092,816 A | * | 7/2000 | Sekine et al. | ............. 267/64.17 |
| 6,494,441 B2 | * | 12/2002 | Beck et al. | ................ 267/64.16 |
| 6,648,308 B2 | * | 11/2003 | Gunnar Rothoff | ........ 267/64.17 |
| 2002/0121416 A1 | | 9/2002 | Katayama et al. | |

FOREIGN PATENT DOCUMENTS

| DE | 3937606 A1 * | 5/1991 |
| JP | 53-151061 | 4/1978 |
| JP | 57-20498 | 2/1982 |

* cited by examiner

*Primary Examiner*—Thomas J Williams
(74) *Attorney, Agent, or Firm*—Rabin & Berdo, PC (57) ABSTRACT

A front fork, which is interposed between a vehicle body and an axle to restrain a change in vehicle attitude, comprises a fork body (101) including a reservoir chamber (106) partially filled with gas and performing an expansion and contraction operation, a reservoir tank (102) partially filled with gas and communicating with the reservoir chamber (106) through a flow path (103) in which hydraulic oil flows, an on-off valve (35) switching between opening and closing of the flow path (103), and a relief valve (40) accepting flow of hydraulic oil from the reservoir chamber (106) toward the reservoir tank (102) when a pressure of the reservoir chamber (106) reaches a predetermined pressure.

14 Claims, 7 Drawing Sheets

FRONT FORK

FIELD OF THE INVENTION

This invention relates to a front fork and, particularly, to a front fork mounted at a front-wheel end of a two-wheeled vehicle to function as a hydraulic shock absorber.

BACKGROUND OF THE INVENTION

A front fork interposed between a vehicle body and an axle of a two-wheeled vehicle to suppress a change in vehicle attitude is equipped with a fork body performing an expansion and contraction operation with a reaction force, a reservoir tank provided outside the fork body, and a cut-off valve provided in a passage communicated between the fork body and the reservoir tank (refer to Japanese Examined Patent Publication No. 57-20498 or Japanese Unexamined Utility Model Publication No. 53-151061, for example).

A front fork of this type switches between the communication and shut-off modes between a gas chamber in the fork body and a gas chamber in the reservoir tank in order to change the effective volume of the gas chamber functioning as an air spring for adjustment of the reaction force of the air spring in two stages.

Thus, the change in vehicle attitude when the two-wheeled vehicle is braked, namely, the nose dive phenomenon in which the vehicle body pitches forwards, is restrained by blocking the inflow of the hydraulic oil from the fork body to the reservoir tank by the cut-off valve to reduce the effective volume of the gas chamber to a high state of the reaction force of the air spring in the front fork.

SUMMARY OF THE INVENTION

However, for reducing the nose dive phenomenon, when the cut-off valve blocks the inflow of hydraulic oil from the fork body to the reservoir tank, the pressure in the gas chamber of the fork body is increasingly made higher by the contraction operation of the fork body. This high pressure may be a cause of oil leakage from the fork body. Therefore, a conventional front fork has a limit of building up the pressure in the gas chamber in the fork body.

Further, even if the nose dive phenomenon can be reduced, when the fork body is thereafter changed from the contraction operation to the expansion operation, the fork body is supposed to perform the expansion operation while remaining in the high reaction-force state. For this reason, a driver holding the handlebar has a feeling of being jerked upward.

The present invention has been made from a viewpoint of the foregoing problems. Accordingly, it is an object of the present invention to provide a front fork capable of stably reducing a change in vehicle attitude when braking and of improving riding comfort of the vehicle.

These and other objects, features, aspects and advantages of the present invention will become apparent to those skilled in the art from the following detailed description, which, taken in conjunction with the annexed drawings, discloses preferred embodiments of the present invention.

In order to achieve above object, the present invention provides a front fork, which is interposed between a vehicle body and an axle to restrain a change in vehicle attitude. The front fork comprises a fork body including a reservoir chamber partially filled with gas and performing an expansion and contraction operation, a reservoir tank partially filled with gas and communicating with the reservoir chamber through a flow path in which hydraulic oil flows, an on-off valve switching between opening and closing of the flow path, and a relief valve that accepts a flow of hydraulic oil from the reservoir chamber toward the reservoir tank when a pressure of the reservoir chamber reaches a predetermined pressure.

DESCRIPTION OF THE PREFERRED EMBODIMENTS

Embodiments of the present invention will be described below with reference to the accompanying drawings.

First Preferred Embodiment

Figure 1:
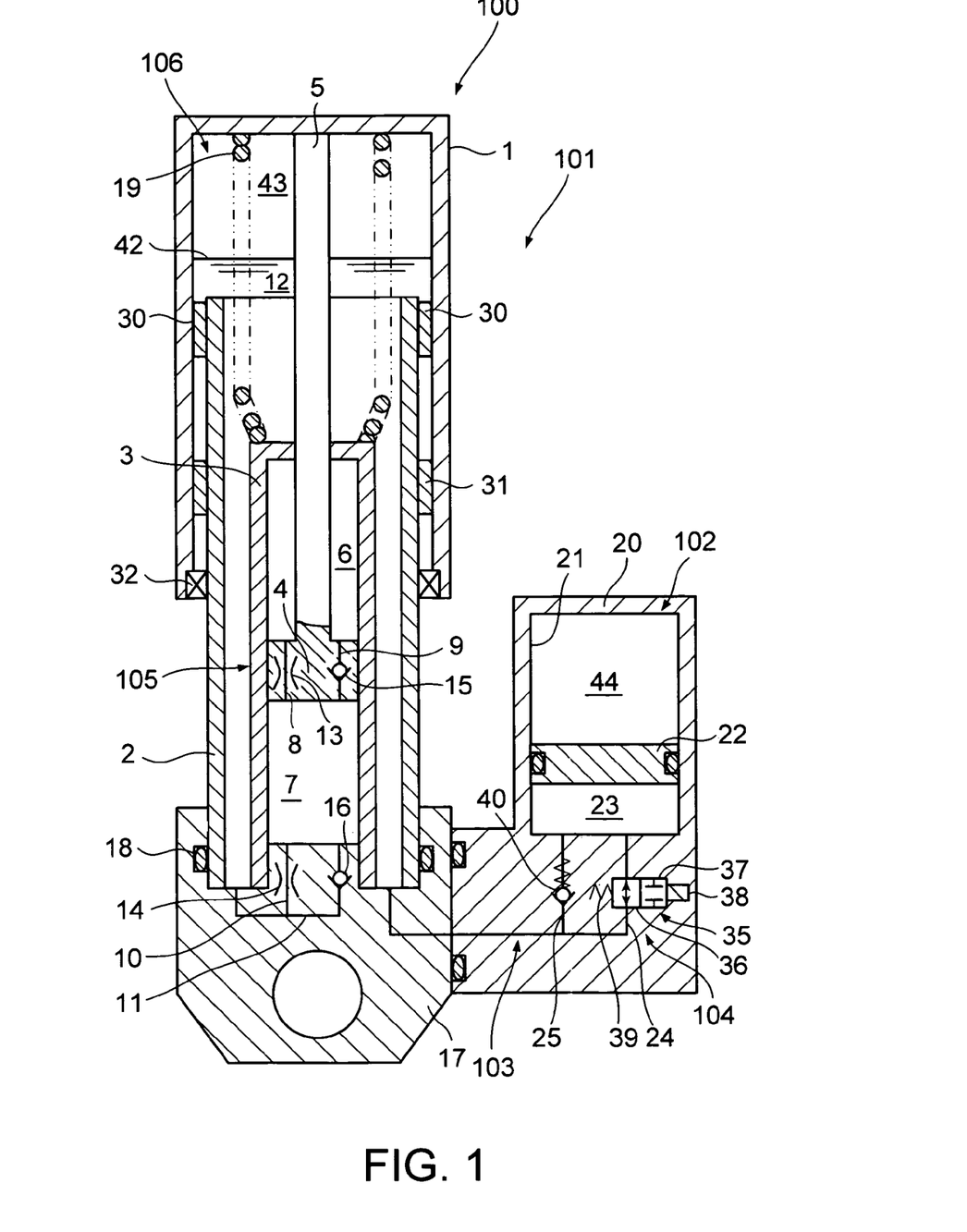
FIG. 1 is a schematic view showing a front fork of a first preferred embodiment of the present invention.

A front fork 100 according to a first preferred embodiment of the present invention will be first described with reference to FIG. 1. FIG. 1 is a schematic view showing the front fork 100.

The front fork 100 is interposed between a vehicle body and a front-wheel axle of a two-wheeled vehicle and functions as a hydraulic shock absorber that absorbs road vibrations exerted on the front wheel to restrain a change in vehicle attitude. The front fork 100 is equipped with a fork body 101 performing an expansion and contraction operation with a reaction force against a change in vehicle attitude, a reservoir tank 102 provided outside the fork body 101 and generating a reaction force when the fork body 101 performs the expansion and contraction operation, and a flow adjusting apparatus 104 placed on a flow path 103 for communication between the fork body 101 and the reservoir tank 102 and adjusting the flow of hydraulic oil.

The fork body 101 has a reservoir chamber 106 partially filled with gas. The fork body 101 has an upper end connected to a side of the handlebar in the two-wheeled vehicle (not shown) and a lower end connected to a side of the front wheel in the two-wheel vehicle, and performs the expansion and contraction operation in a telescoping manner.

The fork body 101 is provided with an outer tube 1 as a vehicle-side tube connected to the handlebar, an inner tube 2 as an axle-side tube connected to the front wheel and fitted so as to slide into the outer tube 1, and a damper portion 105 provided in the inner tube 2 and generating a damping force caused by a relative movement of the outer tube 1 and the inner tube 2.

The inner tube 2 is formed in a tubular shape, and inserted through ring-shaped bearings 30, 31 into the outer tube 1 similarly formed in a tubular shape with allowance for sliding therein. A ring-shaped seal member 32 is provided between an inner periphery of an opening end of the outer tube 1 and an outer periphery of the inner tube 2.

The damper portion 105 is provided with a cylinder 3 mounted on the bottom portion of the inner tube 2 and filled with hydraulic oil, a piston 4 slidably placed in the cylinder 3 and dividing the inside of the cylinder 3 into first and second oil chambers 6 and 7, and a rod 5 having one end connected to the piston 4 and the other end connected to the outer tube 1. Thereby, the piston 4 slides in the cylinder 3 when the outer tube 1 moves along the inner tube 2. The first oil chamber 6 and the second oil chamber 7 communicate with each other by means of passages 8, 9 provided in the piston 4.

The reservoir chamber 106 is formed in a space defined by the outer tube 1 and the inner tube 2, that is, outside the damper portion 105. The second oil chamber 7 in the cylinder 3 communicates with the reservoir chamber 106 by means of passages 10, 11 which are formed at a lower end of the cylinder 3.

Hydraulic oil is sealed into the reservoir chamber 106, so that a gas chamber 43 shown on the upper side in FIG. 1 and an oil chamber 12 shown on the lower side in the FIG. 1 are formed in the reservoir chamber 106 on either side of an oil level 42 acting as the boundary. The hydraulic oil is sealed into reservoir chamber 106 such that the volume of the gas chamber 43 is equal to or smaller than the volume of the portion of the inner tube 2 penetrating the outer tube 1 when the fork body 101 contracts to the maximum. In other words, the volume of the gas chamber 43 is set as a value smaller than the maximum amount of change in the inner volume of the fork body 101 which varies when the fork body 101 performs the expansion and contraction operation.

Damping-force generator mechanisms 13, 14, such as an orifice and a leaf valve, are provided in the respective passages 8 and 10. A check valve 15 is provided in the passage 9 to block the flow of the hydraulic oil from the first oil chamber 6 to the second oil chamber 7. A check valve 16 is provided in the passage 11 to block the flow of the hydraulic oil from the second oil chamber 7 to the reservoir chamber 106.

The lower ends of the cylinder 3 and the inner tube 2 are coupled to a bracket 17 connected to the axle of the two-wheeled vehicle and are sealed. The passages 10, 11 are formed in the bracket 17.

A ring-shaped seal member 18 is provided between the bracket 17 and the inner tube 2. The seal member 18 and the seal member 32 seal the space defined by the outer tube 1 and the inner tube 2.

A suspension spring 19 is interposed between the upper end of the cylinder 3 and the upper end of the outer tube 1. When the front fork 100 is interposed between the vehicle body and the axle, the suspension spring 19 receives the vehicle-body weight and maintains a predetermined ride height.

The reservoir tank 102 is partially filled with gas, and communicates with the reservoir chamber 106 of the fork body 101 by means of the passage 103. The reservoir tank 102 is provided inside the housing 20 connected to a side portion of the bracket 17. The reservoir tank 102 includes an oil chamber 23 and a gas chamber 44 which are defined by a free piston housed and slidably attached to a hollow portion 21 formed in the housing 20. The housing 20 is coupled to the side of the bracket 17, so that the expansion and contraction operation of the fork body 101 is not impeded by the bracket 17.

The flow path 103 is provided in the bracket 17 and the housing 20, and is constituted of passages 24, 25 which establish parallel communication between the oil chamber 12 of the fork body 101 and the oil chamber 23 of the reservoir tank 102. Thereby, the oil chamber 23 of a reservoir tank 102 communicates also with the second oil chamber 7 of the damper portion 105 via the oil chamber 12 of the fork body 101.

The flow adjusting apparatus 104 is equipped with an on-off valve 35 and a relief valve 40 in parallel with each other. The on-off valve 35 is mounted on the passage 24 to switch between the communication and shut-off modes of the passage 24. The relief valve 40 is mounted on the passage 25 to accept the flow of the hydraulic oil from the oil chamber 12 of the fork body 101 to the oil chamber 23 of the reservoir tank 102 when the pressure in the reservoir chamber 106 of the fork body 101 reaches a predetermined cracking pressure in a state of the on-off valve 35 blocking the passage 24. The on-off valve 35 and the relief valve 40 are placed in the housing 20.

The on-off valve 35 is an electromagnetic on-off valve that includes a communication position 36, a shut-off position 37, a solenoid 38, and a spring 39 facing the solenoid 38.

When the solenoid 38 is not energized, the on-off valve 35 is urged by the spring 39 to the communication position 36. When the solenoid 38 is energized, a thrust of the solenoid 38 overcomes a spring force of the spring 39 to move the on-off valve 35 to the shut-off position 37.

In this connection, by adjusting the electric current supplied to the solenoid 38, the opening of the on-off valve 35 may be adjusted to control a flow quantity of the hydraulic oil passing through the on-off valve 35.

Any type of valve may be used as the relief valve 40 as long as the valve has a function as a check valve and also has a mechanism for opening the valve under a predetermined cracking pressure. The adjustment of the cracking pressure of the relief valve 40 is performed by adjusting the load of the spring for urging the valve element.

All of the reservoir tank 102, the on-off valve 35 and the relief valve 40 are incorporated in the housing 20 and assembled together.

The following description is of the operation of the front fork 100.

When the fork body 101 performs the contraction operation, the inner tube 2 penetrates the outer tube 1, so that the volume of the reservoir chamber 106 is reduced. Further, the piston 4 of the damper portion 105 moves in a direction compressing the second oil chamber 7 in the cylinder 3, so that the hydraulic oil in the second oil chamber 7 flows through the passage 10 into the oil chamber 12 of the reservoir chamber 106. As a result, the volume of the gas chamber 43 bounded by the oil level 42 in the reservoir chamber 106 is reduced.

When the fork body 101 performs the expansion operation, the inner tube 2 leaves the inside of the outer tube 1, so that the volume of the reservoir chamber 106 is increased. Further, the piston 4 of the damper portion 105 moves in a direction expanding the second oil chamber 7 in the cylinder 3, so that the insufficient supply of hydraulic oil in the second oil chamber 7 is replenished from the oil chamber 12 of the reservoir chamber 106 through the passage 10. As a result, the volume of the gas chamber 43 bounded by the oil level 42 in the reservoir chamber 106 is increased.

In this manner, the expansion and contraction operation of the fork body 101 increases/decreases the volume of the gas chamber 43 in the reservoir chamber 106, so that the gas in the gas chamber 43 generates repulsion, or an air-spring force.

In the damper portion 105, the hydraulic oil flows through the damping-force generator mechanisms 13, 14 by the movement of the piston 4 in the cylinder 3, so that a pressure loss occurs. In this manner, a damping force in the opposite direction from the moving direction of the piston is generated in the damper portion 105.

In the reservoir tank 102, the oil chamber 23 expands/contracts because a portion of the hydraulic oil flows into the oil chamber 23 from the flow path 103 in accordance with the expansion and contraction operation of the fork body 101. Thus, the gas chamber 44 expands/contracts while moving the piston 22 upward/downward to produce an air-spring force.

Next, the cooperation operation of the fork body 101 and the reservoir tank 102 is described.

When the on-off valve 35 is in the shut-off position 37, the communication between the oil chamber 12 of the fork body 101 and the oil chamber 23 of the reservoir tank 102 is blocked. The front fork 100 uses the small gas-chamber volume of the gas chamber 43 of the fork body 101 alone to produce an air-spring force. Accordingly, the fork body 101 performs the expansion and contraction operation in a high reaction-force state.

When the on-off valve 35 is in the communication position 36, the oil chamber 12 of the fork body 101 and the oil chamber 23 of the reservoir tank 102 communicate with each other, so that the gas chamber 44 of the reservoir tank 102 becomes identical in pressure to the gas chamber 43 of the fork body 101. Thus the front fork 100 uses the large gas-chamber volume of the gas chamber 43 and the gas chamber 44 in accordance with the expansion and contraction operation of the fork body 101 to produce an air-spring force. For this reason, the fork body 101 performs the expansion and contraction operation in a low reaction-force state as compared with the case when it performs the expansion and contraction operation by the use of the gas chamber 43 alone.

In this manner, the on-off valve 35, which enables selection between the communication position 36 and the shut-off position 37, is provided in the passage 24 establishing the fluid communication between the fork body 101 and the reservoir tank 102. This makes it possible to select either a low reaction-force state or a high reaction-force state as the reaction-force state in accordance with the expansion and contraction operation of the fork body 101.

From the foregoing, when the two-wheeled vehicle runs on a flat road or the like, the on-off valve 35 is set at the communication position 36 in order to cause the front fork 100 to produce a low air-spring force. Inconsequence, it is possible to provide an improvement of ride comfort on the vehicle. On the other hand, in the braking operation, the on-off valve 35 is set to be switched to the shut-off position 37 in order to cause the front fork 100 to produce a high air-spring force. In consequence, the vehicle body is restrained from pitching forward, i.e. performing a so-called nose dive.

Further, because the volume of the gas chamber 43 is set as a value smaller than the maximum amount of change in the inside volume of the fork body 101 which varies in accordance with the expanding and contraction operation of the fork body 101, the front fork 100 is capable of producing a very high air-spring force. In consequence, the effect of restraining the nose dive is enhanced.

However, when the volume of the gas chamber 43 is set as smaller as described above, if the fork body 101 continuously contracts while the on-off valve 35 is in the shut-off position 37 in the braking operation of the two-wheeled vehicle, the pressure in the gas chamber 43 is high.

However, when the pressure in the gas chamber 43 exceeds a predetermined cracking pressure, namely the set pressure of the relief valve 40, the relief valve 40 provided in the passage 25 opens to establish communication between the fork body 101 and the reservoir tank 102, so that the hydraulic oil in the oil chamber 12 of the fork body 101 flows into the oil chamber 23 of the reservoir tank 102. Thereby, the pressure in the gas chamber 43 is reduced to achieve a balance with the pressure in the gas chamber 44, in order to prevent an abnormal buildup in the pressure in the reservoir chamber 106 of the fork body 101.

The relief valve 40 is provided in the passage 25 connecting the fork body 101 and the reservoir tank 102 as described above. For this reason, even when the fork body 101 performs the contraction operation with the on-off valve 35 kept in the shut-off position, the pressure in the fork body 101 is not built up abnormally and therefore, the contraction operation of the fork body 101 is not impeded. Further, there is no chance of a large load being applied to the seal member 32 offering a sealing operation between the outer tube 1 and the inner tube 2. This makes it possible to prevent oil leakage through the area between the outer tube 1 and the inner tube 2.

In other words, the provision of the relief valve 40 brings about the avoidance of an impediment to the contraction operation of the front fork 100 and the oil leakage. Hence, it is possible to make the volume of the gas chamber 43 smaller than the maximum amount of change in the inside volume of the fork body 101 which varies when the fork body 101 performs the expansion and contraction operation.

The predetermined cracking pressure of the relief valve 40 may be selectively decided in accordance with the specifications of the seal member 32 and the degree of restraint on the nose dive.

As described hitherto, with the front fork 100 of the first preferred embodiment, a high reaction-force state is achieved by moving the on-off valve 35 to the shut-off position 37 and also when the high reaction-force exceeds a predetermined value, the high reaction-force can be reduced by the operation of the relief valve 40. Accordingly, when the front fork 100 is used as a hydraulic shock absorber mounted on the front wheel in a two-wheeled vehicle, a stable reduction in a change in vehicle attitude, or nose dive, occurring when a brake is applied to the two-wheeled vehicle becomes possible. Also, a low reaction-force state is achieved by switching the on-off shaft to the communication position 36. This makes it possible to improve ride comfort on the vehicle.

Further, a conventional front fork needs communication between a pair of reservoirs of the each front fork, but the front fork 100 of the first preferred embodiment is capable of changing the air-spring force by itself. Accordingly, the front fork 100 is improved in mountability on a two-wheeled vehicle and therefore, has advantages in transportation and storage.

The following description is of another form of the first preferred embodiment.

In the first preferred embodiment, the fork body 101 is designed as an invertible type in which the outer tube 1 is an upper-end member and the inner tube 2 is a lower-end member, but may be designed as a standard type in which the outer tube 1 is the lower-end member and the inner tube 2 is the upper-end member.

Also, because the reservoir tank 102 is divided into two, the gas chamber 44 and the oil chamber 23, by the free piston 22, the housing 20 may be put into a sideways position in the figure. Thereby, the mounting position of the front fork in the two-wheeled vehicle can be set at the optimum position.

Also, a bladder may be used instead of the free piston 22 of the reservoir tank 102. In the case of using the bladder, the bladder is out of sliding contact with the inner periphery of the hollow portion 21 as is the case with the free piston 22, and therefore, has the advantage of no occurrence of sliding resistance.

Also, because the front fork 100 alone changes the air-spring force, for example, if the right and left gas chambers of the front fork 100 differ in volume from each other, four different air-spring forces can be provided by the open/close operation of the on-off valve 35. Thereby, it is possible to provide ride comfort suitable to the feeling of the driver.

Further, the first preferred embodiment has described the case of moving the on-off valve 35 to the communication position 36 or the shut-off position 37, but the on-off valve 35 may be structured in such a way as to maintain the communication position 36 and to control the flow quantity. Thereby, when the fork body 101 performs the contraction operation, the hydraulic oil flows from the fork body 101 to the reservoir tank 102 under resistance.

When the flow control is performed at the on-off valve 35 in this manner, the air-spring force produced by the front fork 100 is larger than the air-spring force when the on-off valve 35 is fully opened and smaller than that when the on-off valve 35 is completely closed.

In other words, the flow control being performed by adjusting the degree of valve opening of the on-off valve 35 makes it possible to adjust the air-spring force produced by the front fork 100, in continuous variations from maximum to minimum. Hence, the air-spring force produced by the front fork 100 is controlled so as to be at the optimum, resulting in an improvement in ride comfort on the two-wheeled vehicle. Further, the need to use a pneumatic source such as a pneumatic pump to change the air-spring pressure is eliminated, leading to energy saving, space saving, and an improvement in mountability on the vehicle.

Second Preferred Embodiment

Figure 2:
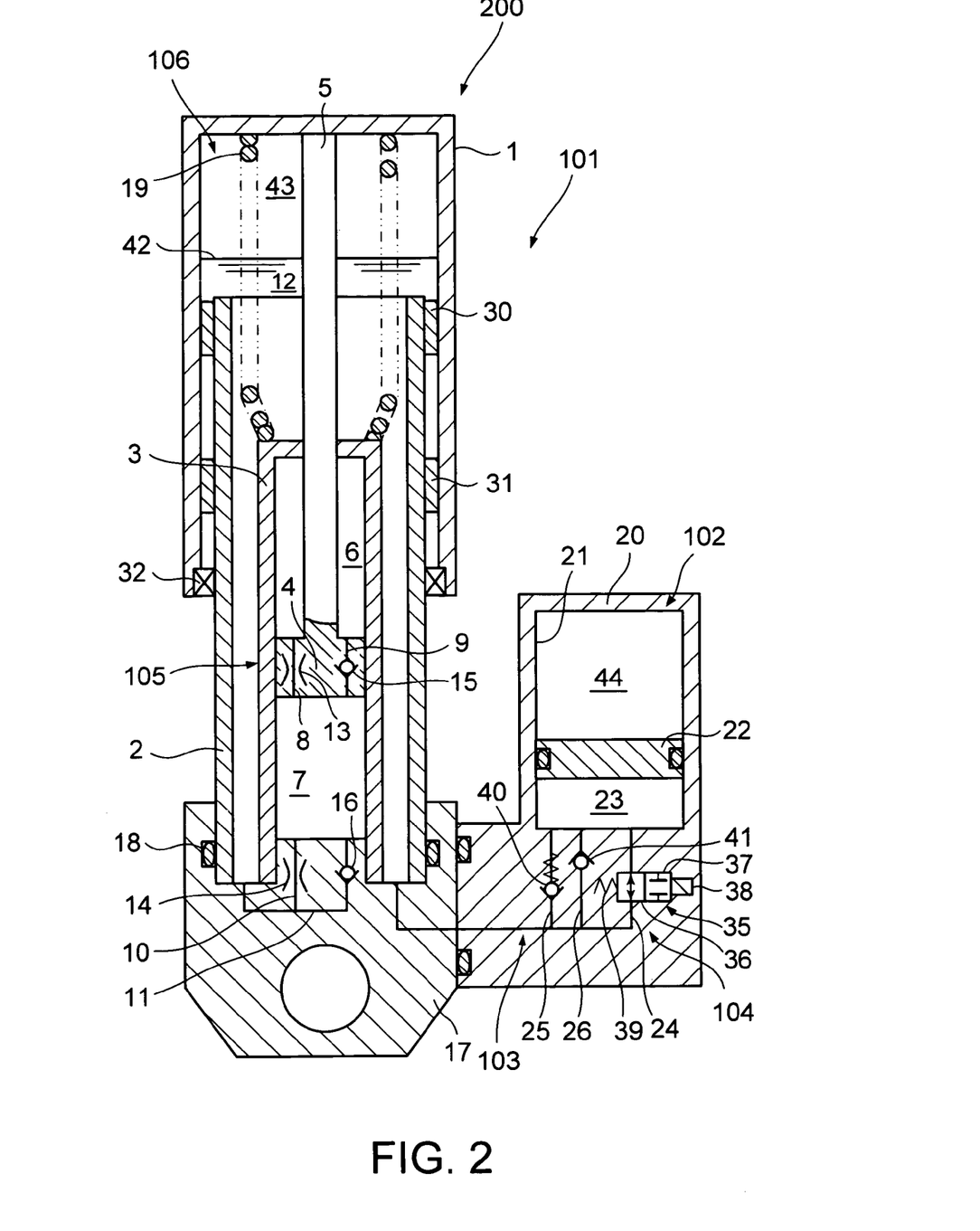
FIG. 2 is a schematic view showing a front fork of a second preferred embodiment of the present invention.

A front fork 200 according to a second preferred embodiment of the present invention is described with reference to FIG. 2. FIG. 2 is a schematic view showing the front fork 200. Note that the same structure as that in the first preferred embodiment is designated by the same reference numerals and the description is omitted.

Differences between the front fork 200 of the second preferred embodiment and the front fork 100 of the first preferred embodiment are that the front fork 200 is equipped with an on-off valve 35 and a relief valve 40 as the flow adjustment apparatus 104 for adjusting a flow of hydraulic oil between an oil chamber 12 of a front fork 101 and an oil chamber 23 of a reservoir tank 102, and further a check valve 41 that accepts only a flow of hydraulic oil from the reservoir tank 102 toward a reservoir chamber 106 of the fork body 101.

The check valve 41 is provided in a passage 26 communicating with a passage 24 and bypassing the on-off valve 35. Note that the check valve 40 is placed in the housing 20 and structured together with the on-off valve 35 and the relief valve 40 as an assembly.

A flow path 103 in the second preferred embodiment is constituted of passages 24 to 26 arranged in parallel. The passages 24, 25 and 26 are joined together and communicate with the oil chamber 12 of the fork body 102.

Even when the on-off valve 35 is in the shut-off position 37, the check valve 41 is opened to accept the hydraulic oil flowing from the reservoir tank 102 back to the fork body 101.

A description is given of the operation when the front fork 200 with the check valve 41 is mounted on the front wheel in a two-wheeled vehicle.

When hard braking is applied to the two-wheeled vehicle, the fork body 101 performs the contraction operation, and then shifts to the expansion operation. At this point, the front fork 200 comes into a high reaction-force state by switching the on-off valve 35 to the shut-off position 37 on the braking of the two-wheeled vehicle, to reduce the nose dive phenomenon. However, if the fork body 101 shifts to the expansion operation during the high reaction-force state, the vehicle body rises high in the air due to reaction.

When the on-off valve 35 maintains the shut-off position 37 and the fork body 101 shifts from the contraction operation to the expansion operation, the pressure of the oil chamber 12 of the fork body 101 is reduced as the expansion operation progresses. Then, when the pressure in the oil chamber 12 becomes lower than the pressure in the oil chamber 23 of the reservoir tank 102, the check valve 41 opens to establish communication between the oil chamber 12 of the fork body 101 and the oil chamber 23 of the reservoir tank 102, and accepts the flow of hydraulic oil from the oil chamber 12 of the reservoir tank 102 to the oil chamber 12 of the fork body 101.

Thereby, the gas-chamber volume of the entire front fork 200 in the expansion operation of the fork body 101 increases, to decrease the air-spring force to be produced by the front fork 200. In this manner, the front fork 200 performs the contraction operation in the high reaction-force state when braking is applied, and then when shifting to the expansion operation, the front fork 200 switches to the low reaction-force state.

As described above, with the front fork 200 of the second preferred embodiment, when the fork body 101 shifts from the contraction state to the expansion operation, the operation of the check valve 41 allows the fork body 101 to perform the expansion operation in the low reaction-force state. Accordingly it is possible to restrain the vehicle body from rising in the air due to reaction to a nose dive. In consequence, an improvement in ride comfort on the vehicle is possible even after a nose dive, without a feeling of being jerked upward being produced in the rider who holds the handlebar of a two-wheeled vehicle.

Further, it is possible to prevent a vacuum phenomenon from occurring in the reservoir chamber 106 of the fork body 101 when the fork body 101 shifts from the contraction state to the expansion operation, due to the operation of the check valve 41.

For reference sake, by switching the on-off valve 35 to the communication position 36 after a nose dive, the same operational advantages can be obtained as in the case of using the check valve 41. In this case, however, there is a need to perform control such as a change in the switching timing of the on-off valve 35 dependent upon the degree of the nose dive. However, in the case of using the check valve 41, without any control, the air-spring force produced by the front fork 200 is mechanically reduced. In consequence, the front fork 200 can be manufactured at low costs and the response is satisfactory.

Third Preferred Embodiment

Figure 3:
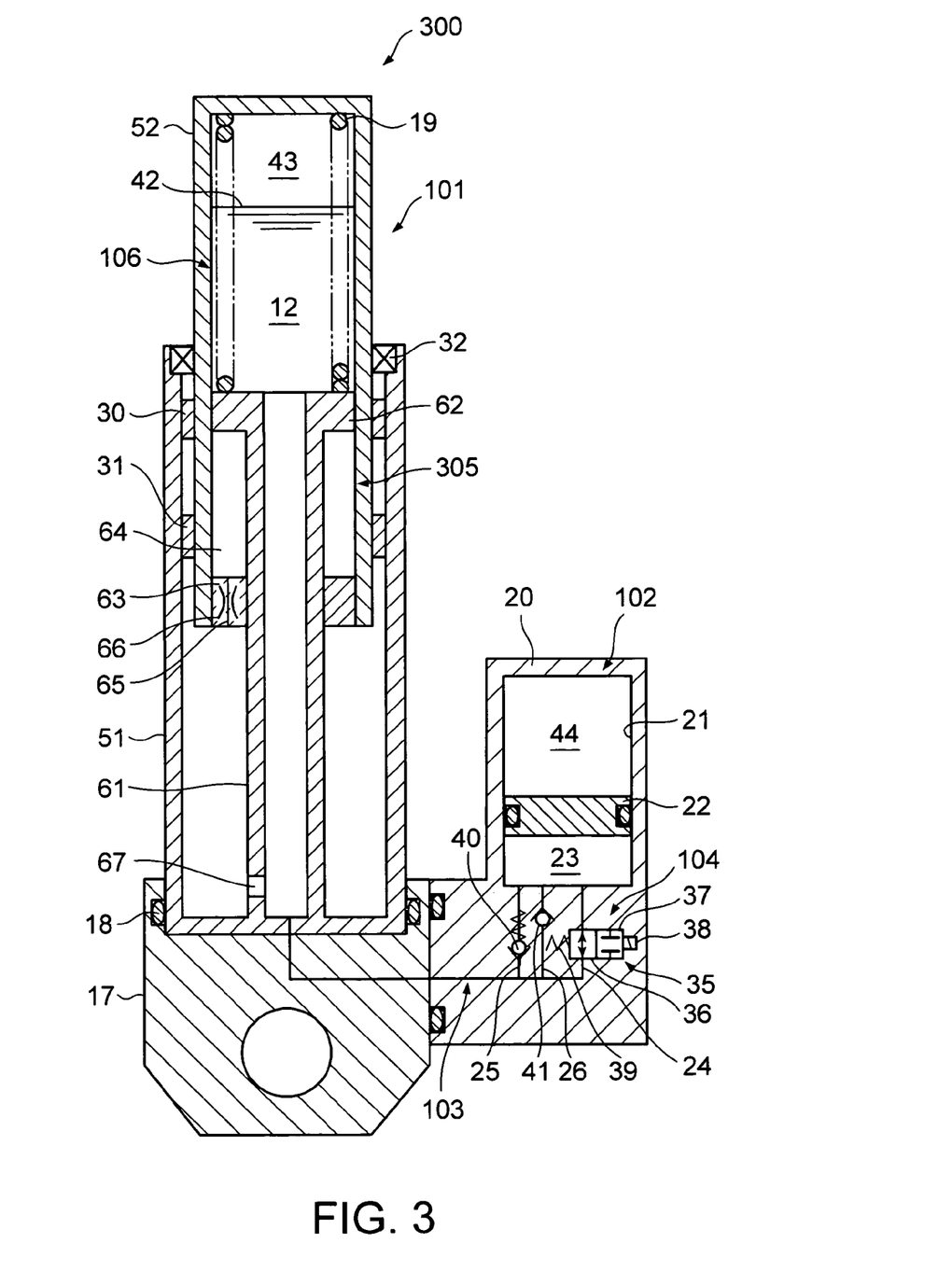
FIG. 3 is a schematic view showing a front fork of a third preferred embodiment of the present invention.

A front fork 300 according to a third preferred embodiment of the present invention is described with reference to FIG. 3. FIG. 3 is a diagram conceptually illustrating the front fork 300. Note that the same structure as that in the first and second preferred embodiments is designated by the same reference numerals and the description is omitted.

Differences between the front fork 300 of the third preferred embodiment and the front fork 200 of the second preferred embodiment lie in that the front fork 200 has the outer tube 1 connected to the side of the vehicle body and the inner tube 2 connected to the side of the axle, but the front fork 300 has an outer tube 51 connected to a side of an axle and an inner tube 52 connected to the side of the vehicle body, and in the structure of a damper portion.

A damper portion 305 in the front fork 300 includes a hollow pipe 61 standing in an axial core portion of the bottom of the outer tube 51, a piston 62 provided on the outer periphery of an upper end of the hollow pipe 61 and in sliding contact with the inner periphery of the inner tube 52, an auxiliary piston 63 provided on the inner periphery of a lower end of the inner tube 52 and in sliding contact with the outer periphery of the hollow pipe 61, and a first oil chamber 64 defined by the inner tube 52, the hollow pipe 61, the piston 62 and the auxiliary piston 63.

A reservoir chamber 106 is defined on the piston 62 in the inner tube 52.

A passage 65 is provided in the auxiliary piston 63 for communication between the first oil chamber 64 and the inside of the outer tube 51. An orifice 66 serving as a damping-force generator mechanism is provided in the passage 65.

A bore 67 is formed in a lower portion of the side of the hollow pipe 61 for communication between the inside and the outside of the hollow pipe 61. The first chamber 64 communicates with the reservoir chamber 106 of the fork body 101 by means of the bore 67.

The oil chamber 23 of the reservoir tank 102 communicates with the inside of the hollow pipe 61, that is, the reservoir chamber 106 of the fork body 101, by means of the flow path 103. Further, the oil chamber 23 communicates with the inside of the damper portion 305 by means of the bore 67.

When the fork body 101 contracts, the first oil chamber 64 of the damper portion 305 is expanded, so that the hydraulic oil flows through the orifice 66 into the first oil chamber 64. As a result, the pressure loss occurs, thereby producing a damping force. On the other hand, when the fork body 101 expands, the first oil chamber 64 is compressed, so that the hydraulic oil flows through the orifice 66 out from the first oil chamber 64. As a result, the pressure loss occurs, thereby producing a damping force.

Regarding the front fork 300 of the third preferred embodiment, the switching operation of the on-off valve 35 allows the switching of the gas-chamber volume of the entire front fork 300 between the total volume of the gas chamber 43, 44 and the volume of the gas chamber 43 alone. Accordingly, as in the case of the front fork 100 of the first preferred embodiment, the air-spring force produced by the front fork 300 is able to be adjusted by the operation of the on-off valve 35.

For the sake of reference, the outer tube 51 may be placed in a portion at the vehicle-body end and the inner tube 52 may be placed in a portion at the axle end. In this case, since gas possibly enters the first oil chamber 64, it is preferable to provide the passage 65 and the orifice 66 in the piston 62.

Fourth Preferred Embodiment

Figure 4:
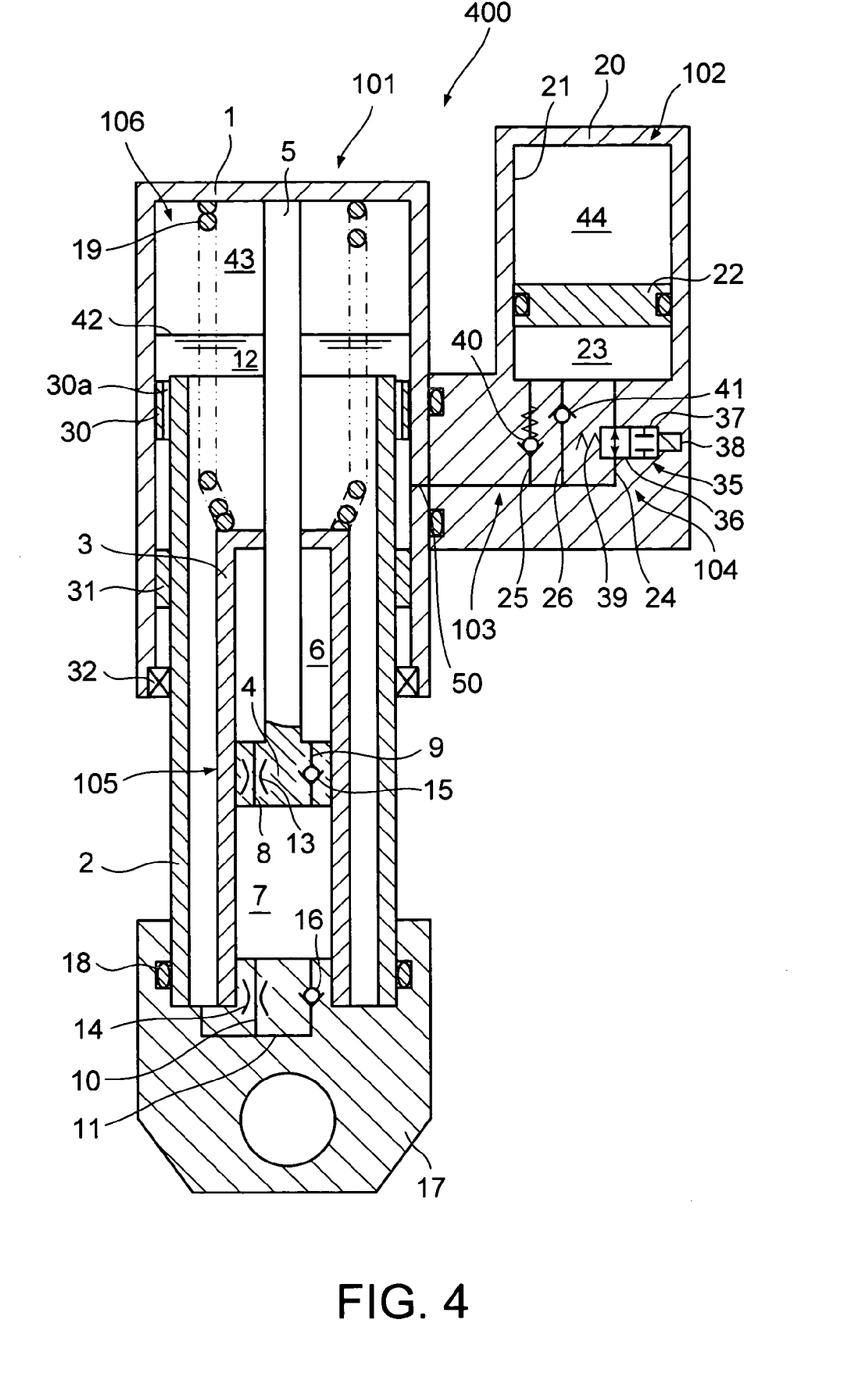
FIG. 4 is a schematic view showing a front fork of a fourth preferred embodiment of the present invention.

A front fork 400 according to a fourth preferred embodiment of the present invention is described with reference to FIG. 4. FIG. 4 is a schematic view showing the front fork 400. Note that the same structure as that in the first and second embodiments is designated by the same reference numerals and the description is omitted.

Differences between the front fork 400 of the fourth preferred embodiment and the front fork 200 of the second preferred embodiment lie in that the housing 20 incorporating an assembly including a reservoir tank 102, an on-off valve 35, a relief valve 40 and a check valve 41 is connected to the outer tube 1.

More specifically, a bore 50 is drilled in the side wall of the outer tube 1 and the housing 20 is connected to the side portion of the outer tube 1 such that the bore 50 and a flow path 103 communicate.

A nick 30a is formed in a bearing 30 for communication between the reservoir tank 102 and a clearance between the outer tube 1 and the inner tube 2 communicates with the reservoir chamber 106 of the fork body 101 by means of the nick 30a. Thus, the reservoir chamber 106 is also formed in a space between the outer tube 1 and the inner tube 2.

With the front fork 400 of the fourth preferred embodiment, the reservoir tank 102, the on-off valve 35, the relief valve 40 and the check valve 41 are combined together as an assembly and incorporated in the housing 20. Therefore, it is possible to connect the housing 20 to the optimum position appropriate to the outer tube 1 or the inner tube 2. Thereby, the mounting position of a front fork on a two-wheeled vehicle is able to be set at the optimum position.

The housing 20 can be provided at the upper end of the outer tube 1. In this case, for example, a passage is formed in a rod 5 to communicate with the first oil chamber 6 or the second oil chamber 7 and a flow path 103 may be connected to the passage.

Fifth Preferred Embodiment

Figure 5:
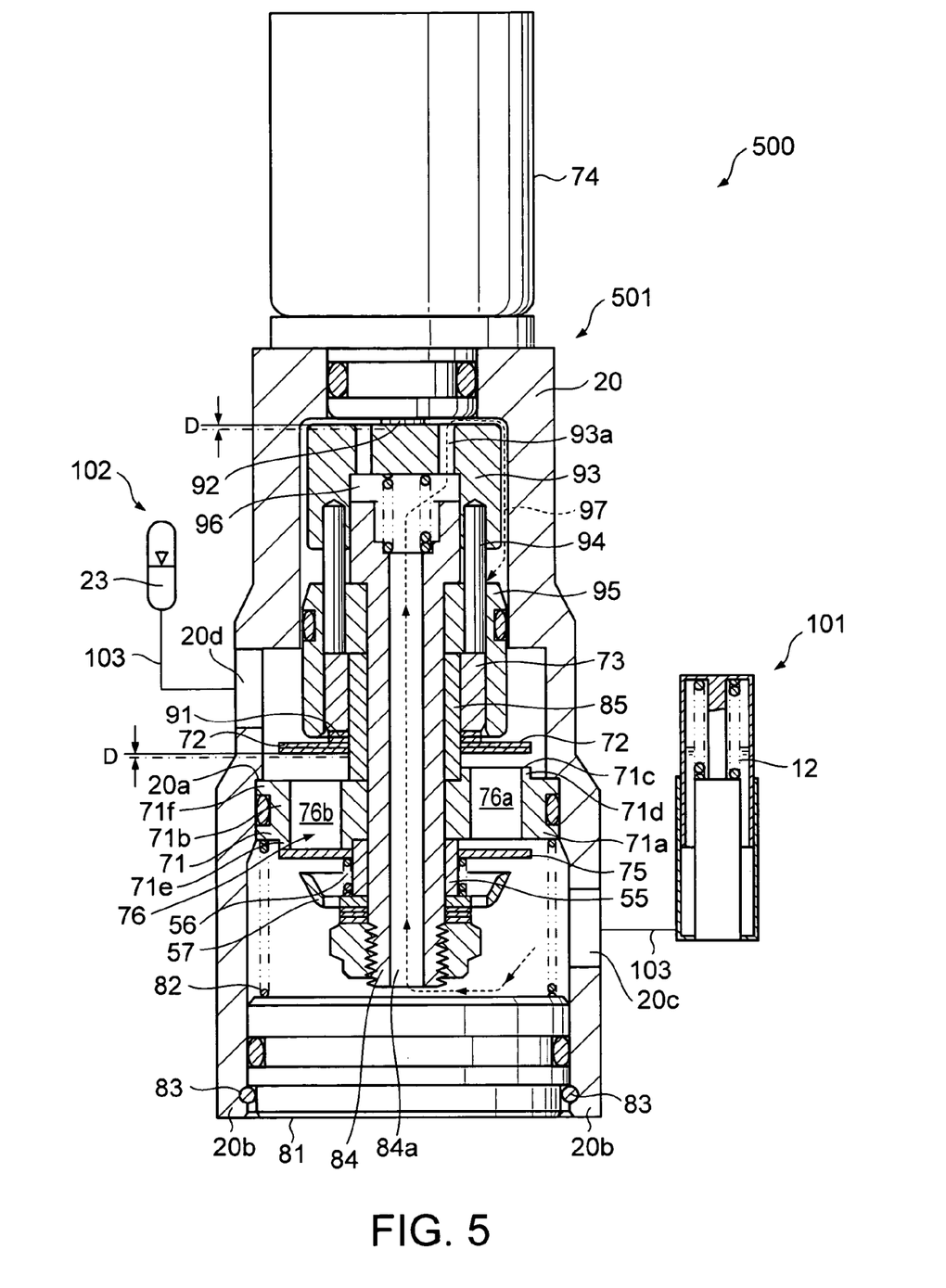
FIG. 5 is a view showing the structure of a valve mechanism interposed between a fork body and a reservoir tank in a front fork of a fifth preferred embodiment of the present invention.
Figure 6:
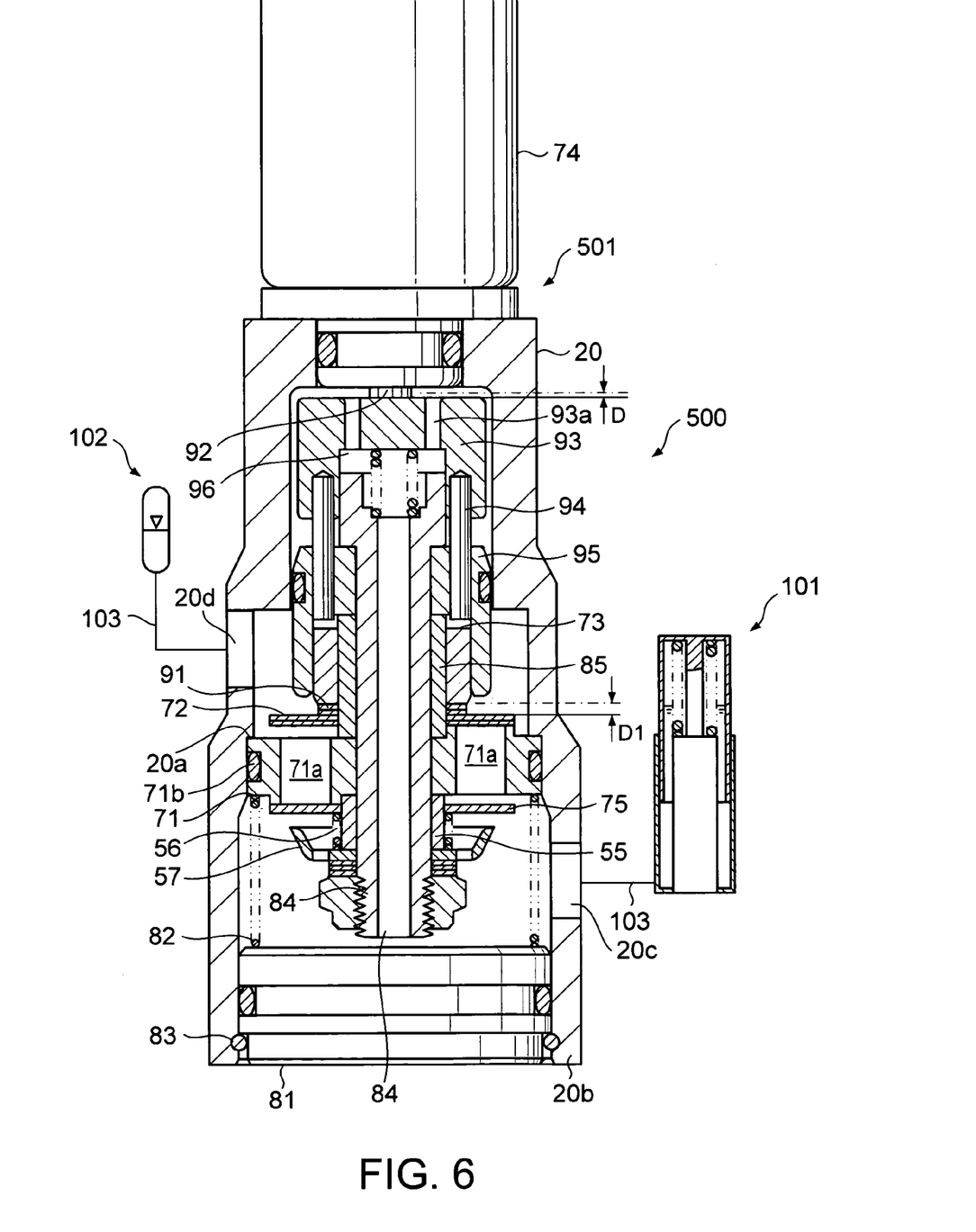
FIG. 6 is a view for explaining the operation of the valve mechanism in the front fork in the fifth preferred embodiment of the present invention.

A front fork 500 according to a fifth preferred embodiment of the present invention is described with reference to FIG. 5, FIG. 6. FIG. 5 is a view showing the structure of a valve mechanism 501 interposed between a fork body 101 and a reservoir tank 102. FIG. 6 is a view for describing the operation of the valve mechanism 501. Note that the same structure as that in the first and second embodiments is designated by the same reference numerals and the description is omitted.

Differences between the front fork 500 of the fifth preferred embodiment and the front fork 200 of the second preferred embodiment lie in that the front fork 200 has the on-off valve 35, the relief valve 40 and the check valve 41 individually provided in the respective passages 24, 25 and 26 which are arranged in parallel, but in the front fork 500, an on-off valve, a relief valve and a check valve are structured as a valve mechanism 501 provided in a flow path 103.

The following description concerns the valve mechanism 501 in the front fork 500 of the fifth preferred embodiment of the present invention.

The valve mechanism 501 is provided in the flow path 103 establishing communication between a fork body 101 and a reservoir tank 102. The valve mechanism 501 is set as a normally opening type that accepts a flow of hydraulic oil in the flow path 103 when a solenoid is not energized and blocks the flow of hydraulic oil in the flow path 103 when the solenoid is energized.

The valve mechanism 501 is placed in the housing 20 disposed to establish communication between the fork body 101 and the reservoir tank 102. In the fifth preferred embodiment, the housing 20 is a withstanding pressure pipe.

The valve mechanism 501 includes a partition wall 71 housed in and attached to the housing 20 and isolating the flow path 103, a plurality of communicating paths 76 penetrating through the partition wall 71 for communication between an oil chamber 12 of the fork body 101 and an oil chamber 23 of the reservoir tank 102, a valve element 72 placed so as to be able to block the communicating path 76, a piston portion 73 placed behind the valve element 72, and a solenoid 74 fixed at the head portion of the housing 20 and driving the valve element 72 in the closing direction by energization. Further, the valve mechanism 501 is provided with a check valve 75 as a second valve element accepting only the flow of hydraulic oil from the reservoir tank 102 to the reservoir chamber 106 of the fork body 101.

The partition wall 71 is a ring-shaped member placed with its outer periphery being in liquid-tight relation to the inner periphery of the housing 20, and divides the inside of the housing 20 into top and bottom in FIG. 5, that is, a portion on the fork body 101 side and a portion on the reservoir tank 102 side.

The partition wall 71 has an outer-periphery angled portion 71f engaged with a step portion 20a formed on the inner periphery of the housing 20. The partition wall 71 is set in a predetermined position by an urging spring 82 having a base end engaged with a cap 81. The urging spring 82 serves also as a spacer. Therefore, the urging spring 82 is not limited to a spring member, and may be a tubular element having an opening formed in its barrel corresponding to a communicating hole 20c.

The partition wall 71 is constituted of a first partition-wall portion 71a having a step portion 71d on the reservoir tank 102 side and a second partition-wall portion 71b having a step portion 71e on the fork body 101 side. The valve element 72 is placed for closure on the reservoir tank 102 side of the partition wall 71 and the check valve 75 is placed for closure on the fork body 101 side of the partition wall 71. Thus the valve element 72 is able to block only a first communicating path 76a as a predetermined communicating path of the plurality communicating paths 76 which is formed in the first partition-wall portion 71a. The check valve 75 is placed to block, when necessary, a second communicating path 76b of the plurality of communicating paths 76 formed in the second partition-wall portion 71b, that is, the communicating path 76 which the valve element 72 is incapable of blocking.

The cap 81 is provided for blocking the opening of the lower end of the housing 20 while keeping it in a liquid-tight state, and is set in a predetermined position by fitting a snap ring 83 formed on the outer periphery of the cap 81 into the inner periphery of the opening end 20b of the housing 20.

The housing 20 has the communicating hole 20c for communication of its interior with the fork body 101, and a communicating hole 20d for communication of its interior with the reservoir tank 102. The partition wall 71 is positioned between the two communicating holes 20c, 20d.

The valve element 72, which is a laminated leaf valve, faces a valve seat face 71c on the reservoir tank 102 side of the partition wall 71, and is placed, slidably in the vertical direction in FIG. 5, on the outer periphery of a guide cylinder 85 mounted on the outer periphery of a center rod 84 which extends through the axial core portion of the partition wall 71 in the vertical direction in FIG. 5. Thereby the valve element 72 is capable of opening/closing the first communicating path 76a of the communicating paths 76.

Because the valve element is a laminated leaf valve, if a pressure difference between upstream and downstream from the valve element 72 exceeds a predetermined value in a state in which the valve element 72 blocks the first communicating path 76a and an oil pressure from the reservoir chamber 106 acts (see FIG. 6), the valve element 72 performs a relief operation in which the vicinity of the outer periphery of the valve element 72 fluctuates to introduce hydraulic oil from the oil chamber 12 of the fork body 101 toward the oil chamber 23 of the reservoir tank 102. In this manner, the valve mechanism 501 makes the valve element 72 perform the operation as a relief valve.

The piston portion 73, which is a tubular member, is disposed movably on the outer periphery of the guide cylinder 85 in the longitudinal direction and behind the valve element 72 in series, to drive the valve element 72 in the closing direction. The piston portion 73 drives the valve element 72 in the closing direction by an external force acting on the rear face of the piston portion 73. This corresponds to the thrust from the solenoid 74 and the oil pressure from the fork body 101, which will be described later.

A lower end of the piston portion 73 is in contact with the rear face of the valve element 72 via a washer 91. Note that the lower end of the piston portion 73 may be in direct contact with the rear face of the valve element 72.

In the case of using the washer 91, the distance between the valve element 72 and the seat face 71c of the partition wall 71 can be discretionally adjusted by selecting the thickness and the number of washers 91 as appropriate.

The solenoid 74 is fixed to the head portion of the housing 20 and has an output shaft 92, which is a plunger, penetrating the housing 20 and disposed in the housing 20. Note that the solenoid 74 may be housed in and attached to the housing 20, or alternatively may be housed in and attached to a casing incorporated in the housing 20.

The amount of movement of the output shaft 92 produced by the thrust of the solenoid 74 is a slight stroke shown by reference letter "D" in FIG. 5. A description will be given later of the reason why such a slight stroke is sufficient as the amount of movement of the output shaft 92 produced by the thrust of the solenoid 74 in the present invention.

The thrust of the solenoid 74 is transferred to the piston portion 73 by a thrust transmission mechanism structured as follows. The thrust transmission mechanism includes a MAS element 93 which is placed in contact with the leading end of the output shaft 92 in the solenoid 74 so as to cover an upper end of a center rod 84, and a plurality of guide rods 94 provided in a lower end of the MAS element 93 in a connected arrangement and extending along the center rod 84.

Each of the guide rods 94 is supported by a holder member 95 also serving as a partition wall and is capable of sliding therein, so that the oscillation of each guide rod 94 is hindered. The holder member 95 is mounted on the outer periphery of the center rod 84 and arranged in series with the guide cylinder 85. The piston portion 73 is interposed between the inner periphery of the lower end of the holder member 95 and the outer periphery of the guide cylinder 85 and is able to slide between them.

Each of the lower ends of the plurality of guide rods 94 is in contact with the piston portion 73. Accordingly, when the solenoid 74 is energized, the MAS element 93 is moved down by the solenoid thrust, and in synchronism with this the guide rods 94 move down, so that the piston portion 73 presses the valve element 72 in the closing direction.

Next, the oil pressure acting on the rear face of the piston portion 73 is described. The oil pressure from the fork body 101 designed to act on the rear face of the piston portion 73 is transferred to the piston portion 73 by an oil-pressure transmission mechanism.

The oil-pressure transmission mechanism includes an oil-pressure transmission path 97 (shown by the broken line in FIG. 5) constituted of a pressure-leading hole 84a penetrating through the axial core portion of the center rod 84, an empty portion 96 formed between the upper end of the center rod 84 and the lower end of the MAS element 93 and communicating wit the pressure-leading hole 84a, a communicating hole 93a penetrating through the MAS element 93 for communication between the empty portion 96 and the outside of the MAS element 93, a clearance between the outside of the MAS element 93 and the housing 20, and a sliding clearance between the guide rod 94 and the holder member 95. This oil-pressure transmission path 97 is formed to pass through the valve element 72 from upstream to downstream.

The oil-pressure transmission path 97 is established by the arrangement in which the holder member 95 also serves as the partition wall and the outer periphery of the holder member 95 is placed in liquid-tight relation to the inner periphery of the housing 20.

The oil-pressure transmission path 97 is able to cause the hydraulic oil flowing from the fork body 101 toward the reservoir tank 102 to diverge upstream from the partition wall 71 so as to introduce a branch flow toward the rear face of the piston portion 73.

Next, the check valve 75 is described. The check valve 75 is placed to block the second communicating path 76b of the plurality of communicating paths 76 which is not blocked by the valve element 72, from the fork body 101 side, when necessary. In this manner, the check valve 75 is placed to be acted upon by the oil pressure from the reservoir tank 102 and operates to accept only the flow of hydraulic oil from the reservoir tank 102 toward the fork body 101.

The check valve 75, which is formed of a ring-shaped relief valve, is mounted movably in the longitudinal direction on the outer periphery of a cylindrical spacer 55 placed on the outer periphery of the center rod 84, and is urged by a non-return spring 56 in the closing direction. Below the check valve 75, a valve stopper 57 is placed to restrict the movement of the check valve 75 when the check valve 75 performs the opening operation against the urging force of the non-return spring 56.

The following is a description of the operation of the valve mechanism 501. When the solenoid 74 is not energized, no external force acts on the valve element 72. Therefore, the flow of hydraulic oil from the fork body 101 toward the reservoir tank 102 lifts the valve element 72 up to the opening position.

When the solenoid 74 is energized, the solenoid 74 drives the valve element 72 via the piston portion 73 in the closing direction in opposition to the flow of hydraulic oil from the fork body 101 toward the reservoir tank 102. Thereby, the valve element 72 moves closer to the seat face 71c of the first partition wall portion 71a. Then, due to the hydraulic oil flowing from the fork body 101 toward the reservoir tank 102, a pressure difference between the upstream and the downstream of the valve element 72 is produced. In other words, the pressure upstream of the valve element 72 builds up.

When the pressure upstream of the valve element 72 increases because of the pressure difference between after and before the valve element 72, the hydraulic oil upstream of the valve element 72 flows into the oil-pressure transmission path 97. Thereby, the oil pressure upstream of the valve element 72 acts on the rear face of the piston portion 73 to cause the piston portion 73 to press the valve element 72 in the closing direction. Then, the valve element 72 is driven again in the closing direction and seated on the seat face 71c of the first partition wall portion 71a of the partition wall 71 so as to block the first communicating path 76a, so that the communication between the fork body 101 and the reservoir tank 102 is disconnected. In this way, the reason why valve element 72 is closed by the pressure upstream of the valve element 72 is because the effective pressure area of the piston portion 73 in the closing direction is set larger than the effective pressure area of the valve element 72 in the opening direction.

The valve element 72 moves a larger stroke length to perform the closing operation as shown by a reference letter "D1" in FIG. 6 as compared with the amount of movement "D" of the output shaft 92 caused by the solenoid thrust. This is because the valve element 72 is acted upon by the oil pressure with the solenoid thrust.

When the solenoid 74 is changed from the energization state to the non-energization state, the valve element 72 is moved in the opening direction by the oil pressure from the fork body 101 to open the first communicating path 76a.

As described hitherto, the valve mechanism 501 has the functions as all of the on-off valve 35, the relief valve 40 and the check valve 41 described in the first to fourth preferred embodiments. Therefore, the front fork 500 including the valve mechanism 501 provides the same operation and advantages as those of the front forks described in the first to fourth preferred embodiments.

The use of the valve mechanism 501 causes a reduction in size of the solenoid 74 because the flow path 103 is completely blocked only by slightly moving the plunger of the solenoid 74. Further, the functions in all of an on-off valve, a relief valve and a check valve are achieved by the single flow path 103. This causes a reduction in size of the hydraulic-oil adjusting apparatus interposed between the fork body 101 and the reservoir tank 102. In consequence, a reduction in size of the front fork 500 with the valve mechanism 501 is also possible.

Sixth Preferred Embodiment

Figure 7:
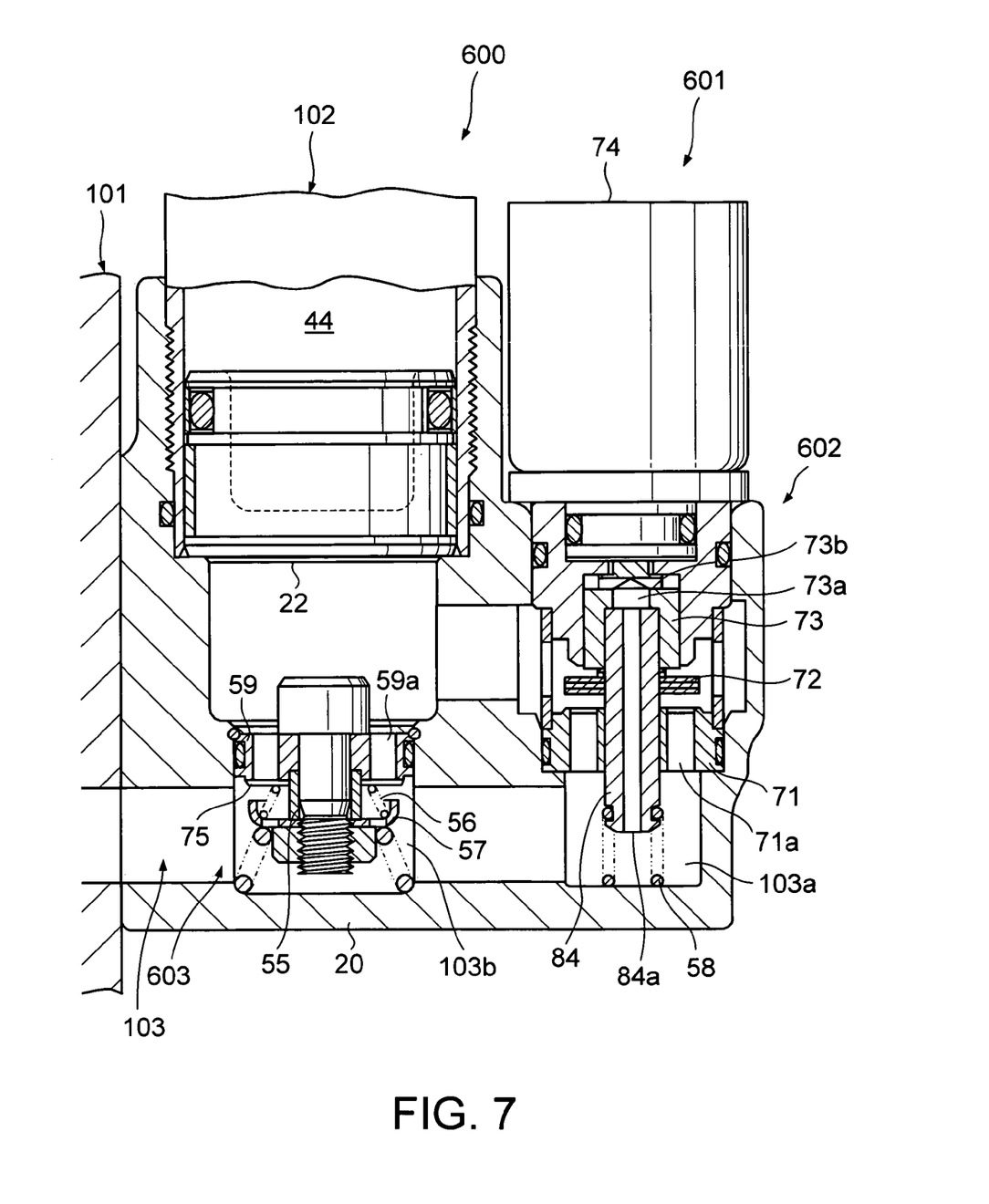
FIG. 7 is a view showing the structure of a valve mechanism interposed between a fork body and a reservoir tank in a front fork of a sixth preferred embodiment of the present invention.

A front fork 600 according to a sixth preferred embodiment of the present invention is described with reference to FIG. 7. FIG. 7 is a schematic view showing the structure of a valve mechanism 601 interposed between a fork body 101 and a reservoir tank 102. Note that the same structure as that in the first, second and fifth preferred embodiments is designated by the same reference numerals and the description is omitted.

Differences between the front fork 600 of the sixth preferred embodiment and the front fork 500 of the fifth preferred embodiment lie in that the front fork 600 has two flow paths arranged in parallel and establishing communication between the front fork 101 and the reservoir tank 102, and a valve mechanism having the functions as an on-off valve and a relief valve is provided in one of the two flow paths and another valve mechanism having the function as a check valve is provided in the other flow path.

A valve mechanism 601 in the front fork 600 includes a first valve mechanism 602 having the functions as the on-off valve and the relief valve and a second valve mechanism 603 having the function as the check valve. The first valve mechanism 602 and the second valve mechanism 603 are respectively provided in two flow paths 103a, 103b which are arranged in parallel.

First, the first valve mechanism 602 is described. The first valve mechanism 602 includes: a valve element 72 placed to block, when necessary, all of a plurality of communicating paths 76 provided in a partition wall 71; a center rod 84 penetrating through an axial core portion of the valve element 72 so as to support the valve element 72; a piston portion 73 engaging with the center rod 84 and driving via the center rod 84 the valve element 72 in the closing direction; and an urging spring 58 attached to the center rod 84 so as to urge the valve element 72 in the opening direction.

The piston portion 73 drives the valve element 72 in the closing direction by the energization of the solenoid 74 and is structured such that the thrust of the solenoid 74 immediately acts on the piston portion 73.

The oil pressure supplied from the fork body 101 is introduced to the rear face of the piston portion 73 through a pressure-leading hole 84a penetrating through the axial core portion of the center rode 84, then a hole 73a formed in the axial core portion of the piston portion 73, and then a lateral hole 73b formed in an upper end of the piston portion 73. The piston portion 73 presses the center rod 84 in the direction of closing the valve element 72.

In this manner, when the solenoid 74 is not energized, the valve element 72 is opened by the urging force of the urging spring 58. On the other hand, upon the energization of the solenoid 74, the valve element 72 is driven in the closing direction by the action of the solenoid thrust and the oil pressure upon the piston portion 73, to block all the communicating paths 76 in the partition wall 71.

Further, since the valve element 72 is a laminated leaf valve, in the conditions that the valve element 72 bocks all the communicating paths 76 and the oil pressure from the fork body 101 acts, when the pressure difference between the upstream and the downstream of the valve element 72 exceeds a predetermined value, the valve element 72 performs a relief operation of fluctuating to accept the flow of hydraulic oil from the fork body 101 toward the reservoir tank 102.

Next, the second valve mechanism 603 is described. The second valve mechanism 603 includes: a partition wall 59 for isolating the flow path 103; a plurality of communicating paths 59a penetrating through the partition wall 59 to establish communication between an oil chamber 12 in the fork body 101 and an oil chamber 23 in the reservoir tank 102; a check valve 75 placed so as to block, when necessary, all the plurality of communicating paths 59a; and a non-return spring 56 urging the check valve 75 in the closing direction.

Since the check valve 75 is positioned opposite the partition wall 59 from the fork body 101, the check valve 75 is placed in the state of being acted upon by the oil pressure from the reservoir tank 102 and operates to accept only the flow of hydraulic oil from the reservoir tank 102 toward the fork body 101.

With the front fork 600 of the forgoing sixth preferred embodiment, the first valve mechanism 602 having the functions as the on-off valve and the relief valve and the second valve mechanism 603 having the function as the check valve are arranged separately from each other. For this reason, as compared with the case of the front fork 500 in the fifth preferred embodiment, it is possible to prevent interference between the operation of the on-off valve mechanism and the operation of the check valve mechanism, thus achieving a stable valve operation.

This application claims priority to Japanese Patent Application No. 2004-356380, No. 2005-31184, No. 2005-139410, and No. 2005-189606. The entire disclosure of Japanese Patent Application No. 2004-356380, No. 2005-31184, No. 2005-139410, and No. 2005-189606 is hereby incorporated herein by reference.

While only the selected preferred embodiments have been chosen to illustrate the present invention, it will be apparent to those skilled in the art from this disclosure that various changes and modifications can be made therein without departing from the scope of the invention as defined in the appended claims. Furthermore, the foregoing description of the preferred embodiments according to the present invention is provided for illustration only, and not for the purpose of limiting the invention as defined by the appended claims and their equivalents.

What is claimed is:

1. A front fork interposed between a vehicle body and an axle to restrain a change in vehicle attitude, comprising:
   an expandable and contractable fork body including a reservoir chamber partially filled with gas;
   a reservoir tank partially filled with gas and communicating with the reservoir chamber through a flow path in which hydraulic oil flows;
   an on-off valve blocking the flow path when the vehicle is in a braking operation;
   a relief valve that accepts a flow of hydraulic oil from the reservoir chamber toward the reservoir tank when a pressure of the reservoir chamber reaches a predetermined pressure by contraction of the fork body in the braking operation in a state of the on-off valve blocking the flow path; and
   a check valve that accepts only a flow of hydraulic oil from the reservoir tank toward the reservoir chamber when the pressure of the reservoir chamber becomes lower than the pressure of the reservoir tank by shifting from a contraction operation to an expansion operation of the fork body in the state of the on-off valve blocking the flow path.

2. A front fork according to claim 1, wherein:
   a gas volume of the reservoir chamber is smaller than a maximum amount of change in an interior volume of the fork body varying when the fork body performs the expansion and contraction operation.

3. A front fork according to claim 1, wherein: the on-off valve comprises:
   a valve element placed in the flow path to block the flow of hydraulic oil from the reservoir chamber toward the reservoir tank;
   a solenoid driving the valve element in a direction of closing the valve element upon being energized; and
   a piston portion receiving an oil pressure upstream of the valve element to drive the valve element in the direction of closing the valve element, wherein:
   with energization of the solenoid, the valve element is driven in the direction of closing the valve element to produce a pressure difference between upstream and downstream of the valve element, and then an oil pressure upstream of the valve element is caused to act on the piston portion for closing the valve element 4. A front fork according to claim 3, wherein:
   an effective pressure area of the piston portion in the direction of closing the valve element is larger than an effective pressure area of the valve element in a direction of opening the valve element.

5. A front fork according to claim 3, wherein:
   the upstream oil pressure is introduced to a rear face of the piston portion via an oil pressure transmission path passing through the valve element from upstream to downstream.

6. A front fork according to claim 3, wherein: the valve element includes a laminated leaf valve deflecting and opening when the pressure difference between upstream and downstream of the valve element exceeds a predetermined value during a state of blocking the flow path, the laminated leaf valve constituting the relief valve.

7. A front fork according to claim 6, wherein:
   a second valve element placed in parallel with the valve element in the flow path is provided to open only when an oil pressure of the reservoir tank exceeds an oil pressure of the reservoir chamber, the second valve element constituting the check valve.

8. A front fork according to claim 1, wherein: the on-off valve comprises:
   a partition wall for isolating the flow path;

a plurality of communicating paths penetrating through the partition wall and establishing communication between an oil chamber of the fork body and an oil chamber of the reservoir tank;

a valve element placed to block a predetermined communicating path out of the plurality of communicating paths from the reservoir tank side;

a solenoid driving the valve element in a direction of closing the valve element in opposition to the flow of hydraulic oil from the reservoir chamber toward the reservoir tank when energized; and a piston portion receiving an oil pressure upstream of the valve element and driving the valve element in the direction of closing the valve element; wherein:

with energization of the solenoid, the valve element is driven in the direction of closing the valve element to produce a pressure difference between upstream and downstream of the valve element, and then an oil pressure upstream of the valve element is caused to act on the piston portion in order for the valve element to block the predetermined communicating path;

the valve element includes a laminated leaf valve deflecting and opening when the pressure difference between upstream and downstream of the valve element exceeds a predetermined value during a state of blocking the predetermined communicating path, the laminated leaf valve constituting the relief valve; and a second valve element placed to block, from the fork body side, a communicating path of the plurality of communicating paths which is not able to be blocked by the valve element is provided to open only when an oil pressure of the reservoir tank exceeds an oil pressure of the reservoir chamber, the second valve element constituting the check valve.

9. A front fork according to claim 1, wherein: the on-off valve performs a flow quantity control.

10. A front fork according to claim 1, wherein:
the reservoir tank, the on-off valve, and the relief valve are provided in a housing provided outside the fork body.

11. A front fork according to claim 10, wherein:
the housing is connected to a vehicle-side tube or an axle-side tube constituting the fork body.

12. A front fork according to claim 11, wherein:
the reservoir chamber is formed in a space between the vehicle-side tube and the axle-side tube.

13. A front fork interposed between a vehicle body and an axle to restrain a change in vehicle attitude, comprising:

an expandable and contractable fork body including a reservoir chamber partially filled with gas;

a reservoir tank partially filled with gas and communicating with the reservoir chamber through a flow path in which hydraulic oil flows;

an on-off valve switching between a communication position where it opens the flow path and a shut-off position where it blocks the flow path, the on-off valve allowing, in the communication position, the hydraulic oil to flow from the fork body into the reservoir tank when the fork body contracts, the on-off valve being in the shut-off position when the vehicle is in a braking operation;

a relief valve that accepts a flow of hydraulic oil from the reservoir chamber toward the reservoir tank when a pressure of the reservoir chamber reaches a predetermined pressure by contraction of the fork body in the braking operation while the on-off valve is in the shut-off position; and a check valve that accepts only a flow of hydraulic oil from the reservoir tank toward the reservoir chamber when the pressure of the reservoir chamber becomes lower than the pressure of the reservoir tank by shifting from a contraction operation to an expansion operation of the fork body in the state of the on-off valve blocking the flow path.

14. A front fork according to claim 1, wherein the on-off valve, the relief valve and the check valve are connected in parallel with each other between the reservoir chamber and the reservoir tank.

* * * * *